United States Patent
Maruno et al.

(10) Patent No.: US 8,888,069 B2
(45) Date of Patent: Nov. 18, 2014

(54) VALVES HAVING HIGH WEAR-RESISTANCE AND HIGH CORROSION-RESISTANCE

(75) Inventors: Yusaku Maruno, Tokai (JP); Seunghwan Park, Mito (JP); Yoshihisa Kiyotoki, Hitachinaka (JP); Shin Kumagai, Tokai (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 362 days.

(21) Appl. No.: 13/075,228

(22) Filed: Mar. 30, 2011

(65) Prior Publication Data
US 2011/0278490 A1 Nov. 17, 2011

(30) Foreign Application Priority Data
Apr. 1, 2010 (JP) ................................. 2010-084783

(51) Int. Cl.
| | |
|---|---|
| *F16K 25/00* | (2006.01) |
| *B21K 1/24* | (2006.01) |
| *F16K 15/03* | (2006.01) |
| *B23K 20/12* | (2006.01) |
| *G21D 1/02* | (2006.01) |
| *F16K 3/12* | (2006.01) |
| *C22F 1/10* | (2006.01) |

(52) U.S. Cl.
CPC .............. *G21D 1/02* (2013.01); *B23K 2201/34* (2013.01); *C21D 2261/00* (2013.01); *C21D 2251/04* (2013.01); *B23K 2203/08* (2013.01); *F16K 15/03* (2013.01); *B23K 20/1275* (2013.01); *B23K 2201/006* (2013.01); *Y02E 30/40* (2013.01); *F16K 3/12* (2013.01); *C22F 1/10* (2013.01); *B23K 20/122* (2013.01); *F16K 25/005* (2013.01)
USPC ....... 251/368; 251/318; 29/890.131; 428/668

(58) Field of Classification Search
USPC .............. 251/368, 318; 29/890.131; 428/668, 428/768
See application file for complete search history.

(56) References Cited

U.S. PATENT DOCUMENTS 4,172,162 A * 10/1979 Danzey, Jr. .................... 427/225
5,633,094 A * 5/1997 Takeshima et al. ........... 428/679
(Continued)

FOREIGN PATENT DOCUMENTS

| JP | 10-331659 | 12/1998 |
|---|---|---|
| JP | 2000-095219 | 4/2000 |

(Continued)

OTHER PUBLICATIONS

Japanese Office Action for Application No. 2010-084783, mailed Mar. 19, 2013 with English language translation of Japanese Office Action.

*Primary Examiner* — Elizabeth Houston
*Assistant Examiner* — Daphne M Barry
(74) *Attorney, Agent, or Firm* — Antonelli, Terry, Stout & Kraus, LLP.

(57) ABSTRACT

The invention provides a valve which suppresses a continuous corrosion of a chemical compound phase such as an eutectic carbide or the like in a valve seat, and improves a corrosion resistance, an impact resistance and an erosion resistance of the valve seat. The invention disperses a chemical compound phase such as the eutectic carbide or the like crystallizing in a dendrite gap as a granular shape or a blocky shape which is equal to or less than about 100 μm, by moving a tool rotating in a crimped state by a load application to a vertical direction to a surface of the valve seat so as to carry out a friction stir processing, and forming a weld metallographic structure of a surface layer portion of the valve seat as a cubic.

6 Claims, 5 Drawing Sheets

VALVE SEAT METALLOGRAPHIC STRUCTURE OF PRESENT INVENTION (56) References Cited

U.S. PATENT DOCUMENTS

| | | |
|---|---|---|
| 2001/0017906 A1 | 8/2001 | Chigasaki et al. |
| 2001/0045231 A1* | 11/2001 | Monod ............... 137/454.2 |
| 2003/0026379 A1 | 2/2003 | Kiyotoki et al. |
| 2003/0129075 A1* | 7/2003 | Kiyotoki et al. ......... 420/435 |
| 2003/0132415 A1* | 7/2003 | Chigasaki et al. ......... 251/368 |
| 2007/0081916 A1 | 4/2007 | Chigasaki et al. |

FOREIGN PATENT DOCUMENTS

| | | |
|---|---|---|
| JP | 2000-273573 | 10/2000 |
| JP | 2001-281394 | 10/2001 |
| JP | 2003-166978 | 6/2003 |
| JP | 2009-28756 | 2/2009 |
| JP | 2009-142845 | 7/2009 |
| JP | 2010-150621 | 7/2010 |

* cited by examiner

FIG.1A
CONVENTIONAL VALVE SEAT METALLOGRAPHIC STRUCTURE

FIG.1B
VALVE SEAT METALLOGRAPHIC STRUCTURE OF PRESENT INVENTION

VALVES HAVING HIGH WEAR-RESISTANCE AND HIGH CORROSION-RESISTANCE

BACKGROUND OF THE INVENTION (1) Field of the Invention

The present invention relates to a valve which is used in a nuclear power plant and a thermal power plant, and is provided with a valve seat (a part of a slide or contact portion), and more particularly to a reforming of a metal metallographic structure and a technique of improving a material property going with the same, with regard to a material of a weld overlay used in a valve seat.

(2) Description of Related Art

In general, in an equipment such as a valve or the like having a valve seat, which is used in a power generation plant or the like, it is requested for the valve seat to stand up to an impact caused by opening and closing the valve during an actual operation, for the valve seat to stand up to a high flow rate, a cavitation and an impact of a liquid drop, and for the valve seat to have an excellent corrosion resistance under a high-temperature and high-pressure environment.

In this regard, a valve provided with a valve seat of a hard material of weld overlay has been conventionally prepared by using a method of dissolving a Co base alloy, an Ni base alloy or an Fe base alloy which is excellent in a corrosion resistance and an abrasion resistance at a high temperature, and weld overlaying on a valve case and a valve body.

However, in the case of weld overlaying the surface deposit metal by the high temperature dissolving, a metallographic structure of the weld overlay valve seat such as the Co base alloy, the Ni base alloy, the Fe base alloy or the like which is used generally, takes on the same structure aspect as a metallographic structure of a metal material which is prepared by casting, a dendrite (a base portion) crystallizes at a time of cooling from a molten state at the high temperature dissolving time to a solid state, and a chemical compound phase such as a dendrite like eutectic carbide or a boride is formed in a gap of the dendrite.

In the surface deposit metal such as the Co base alloy, the Ni base alloy, the Fe base alloy or the like, a corrosion resistance and an abrasion resistance of a chemical compound phase such a dendrite like eutectic carbide crystallizing to the dendrite gap or the like is lower in comparison with the dendrite base portion, it is impossible to stop a progress of a selective corrosion of the chemical compound phase caused by a fluid coming into contact with the surface deposit metal and a surface erosion of the surface deposit metal generated by an erosion or the like, in the light of its characteristic reason, and it is necessary to carry out a frequent inspecting and repairing work.

On the other hand, for the purpose of suppressing or inhibiting the selective corrosion of the chemical compound phase such as the dendrite like eutectic carbide or the like, for example, as shown in patent document 1 (JP-A-2000-273573), there has been invented a corrosion resisting and abrasion resisting alloy of Co base alloy, Ni base alloy or Fe base alloy in which a chemical compound phase such as an eutectic carbide or the like is dispersed as a blocky shape or a granular shape. Further, for example, as shown in patent document 2 (JP-A-2000-095219), a diffusion bonding technique has been invented as a technique of preparing a valve seat by using the corrosion resisting and abrasion resisting alloy, and bonding to the valve case or the valve body while the valve seat keeps a metallographic structure having a blocky or granular chemical compound phase. However, since the diffusion bonding method is a technique of inserting an insert material which is different in a mechanical characteristic and a composition from the valve seat, between the valve case or the valve body and the valve seat, and bonding in accordance with a heat treatment, there is fear of a reduction of the mechanical characteristic in an intermediate layer formed between the valve case or the valve body and the valve seat, in some materials, as well as an increase of a man hour.

If the valve provided with the valve seat of the hard surface deposit metal is prepared by dissolving the surface deposit metal such as the Co base alloy, the Ni base alloy, the Fe base alloy or the like at a high temperature and buildup welding to the valve case and the valve body, like the conventional manner, the metallographic structure of the valve seat necessarily comes to a dendrite structure, and the chemical compound phase such as the eutectic carbide or the like is formed like a mesh in the dendrite gap. Since the chemical compound phase such as the eutectic carbide or the like is continuously distributed in the dendrite gap, once the selective corrosion of the chemical compound phase such as the eutectic carbide or the like is generated, the corrosion continuously makes progress, and a surface roughness of the valve seat and a reduction of a leakage resistance going therewith are generated.

BRIEF SUMMARY OF THE INVENTION

An object of the present invention is to provide a valve which suppresses the continuous corrosion of the chemical compound phase such as the eutectic carbide or the like in the valve seat, and improves a corrosion resistance, an impact resistance and an erosion resistance of the valve seat.

In accordance with the present invention, there is provided a valve including a valve body and a valve case, and having valve seats respectively on sliding surfaces of the both, wherein each of the valve seats is made of at least one kind selected from a Co base, an Ni base and an Fe base, and a surface layer of the valve seat is formed by a base portion made of a cubic and an alloy to which a granular or blocky eutectic chemical compound having a grain diameter equal to or less than 100 µm is dispersed.

In the valve in accordance with the present invention, it is preferable that the valve seat is bonded to a valve seat having different structures (inner layer: dendrite structure, middle layer: processing structure, surface layer: cubic structure) in a thickness direction of the valve seat.

In the valve in accordance with the present invention, it is preferable that the valve seat bonded to the valve body and the valve case is formed by a surface hardened weld overlay material, and is formed by carrying out a friction stir processing on a surface of the valve seat, and cooling the surface weld overlay material after melting or half melting.

In the valve in accordance with the present invention, it is preferable that the valve as recited in any one of the first to third aspects is used in a nuclear power plant.

In accordance with the present invention, there can be provided the valve which is excellent in an impact resistance and a maintenance performance, as well as suppressing a continuous progress of a corrosion and an erosion damage of the valve prepared by dissolving the surface deposit metal such as the Co base alloy, the Ni base alloy or the Fe base alloy at a high temperature, and buildup welding to the valve case and the valve body, and simultaneously suppressing a reduction of a leakage resistance caused by an increase of the friction resistance in the sliding portion of the valve and a roughness of the valve seat surface or the like.

Other objects, features and advantages of the invention will become apparent from the following description of the embodiments of the invention taken in conjunction with the accompanying drawings.

DESCRIPTION OF REFERENCE NUMERALS 1 base material of valve body or valve case
2 dendrite (base material portion)
3 chemical compound phase of dendrite like eutectic carbide or the like
4 cubic structure (base material portion)
5 chemical compound phase of granular or blocky eutectic carbide or the like
6 transient region of inner layer (dendrite) and surface layer (cubic) or processing structure
7 friction stir tool
8 shoulder portion of friction stir tool
9 pin like probe of friction stir tool
10 valve seat (surface deposit metal)
11 valve seat surface after friction stir processing
12 valve seat portion of valve case of gate valve
13 valve body of gate valve
14 valve case of gate valve
15 valve rod of gate valve
16 valve seat portion to which friction stir processing is applied
17 valve seat portion of valve case of check valve
18 valve body of check valve
19 valve case of check valve

DETAILED DESCRIPTION OF THE INVENTION

The present invention disperses a chemical compound phase such as an eutectic carbide or the like crystallizing in a dendrite gap as a granular shape or a blocky shape which is equal to or less than about 100 μm, by moving a tool rotating in a crimped state by a load application to a vertical direction to a surface of a valve seat so as to carry out a friction stir processing, and forming a weld metallographic structure of a surface layer portion of the valve seat as a cubic, with respect to a valve which is prepared by dissolving a surface deposit metal such as a Co base alloy, an Ni base alloy or an Fe base alloy at a high temperature, and buildup welding to a valve case and a valve body.

A description will be in detail given below of the present invention with reference to the accompanying drawings.

Figure 1A:
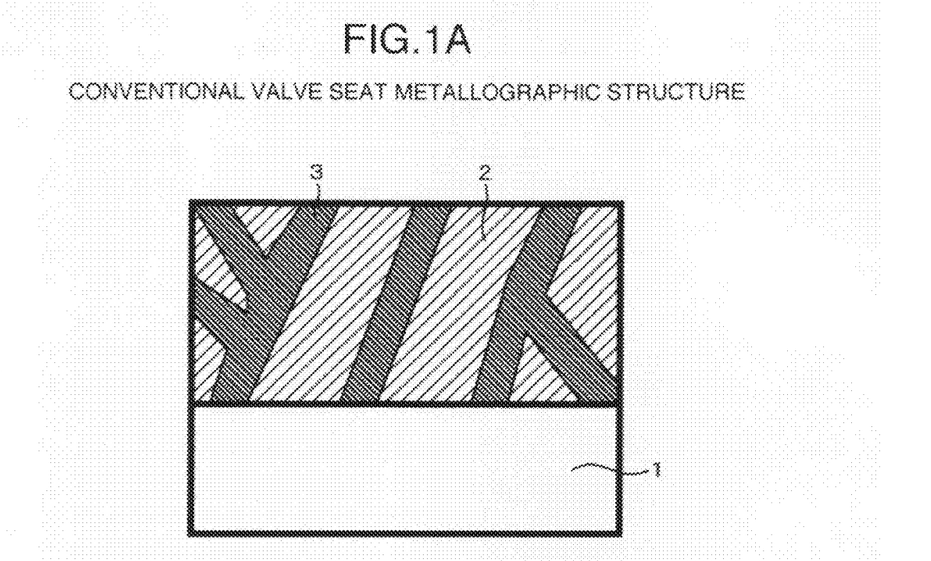
FIGS. 1A and 1B are conceptual views of cross sectional metallographic structures of a conventional valve seat and a valve seat in accordance with the present invention.
Figure 1B:
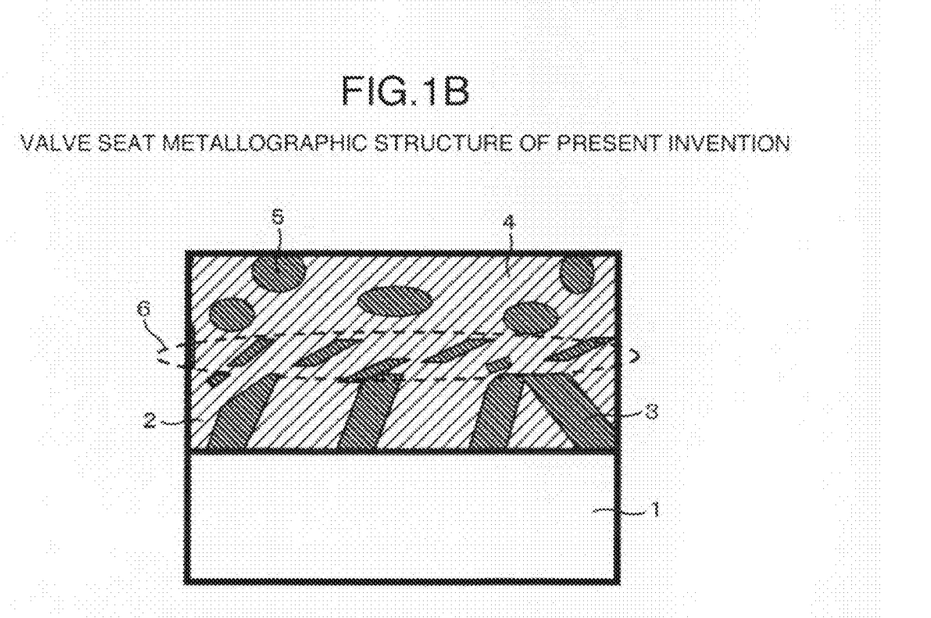

In accordance with the present invention, it is possible to form a chemical compound phase 3 such as a dendrite like eutectic carbide or the like which is continuously distributed in a dendrite (base material) gap of a cast structure in a slide portion and a surface layer of the valve seat as a chemical compound phase 5 such as a granular or blocky eutectic carbide or the like, by reforming only the surface layer of the cast structure constructing the surface deposit metal such as the Co base alloy, the Ni base alloy or the Fe base alloy which is used as the corrosion resisting and abrasion resisting material such as a slide portion of an equipment and a valve seat portion of a valve shown in FIG. 1A in accordance with a friction stir processing, and forming as a cubic as shown in FIG. 1B, whereby it is possible to suppress a reduction of a corrosion resistance and an erosion resistance, and further suppress a reduction of a leakage resistance of the valve caused by a surface roughness of the valve seat.

In order to prepare a valve seat in which a cast structure is reformed in a part of a valve seat surface or a whole surface of the valve seat surface, a friction stir processing is applied to the valve seat surface, by moving a tool rotating in a state of being crimped with respect to the valve seat surface on the basis of a load application in a vertical direction on the valve seat surface.

Figure 2:
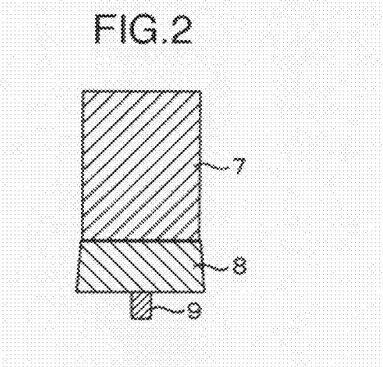
FIG. 2 is a conceptual view of a friction stir tool.

A conceptual view of the tool for the friction stir is shown in FIG. 2. A tool 7 for the friction stir has a shoulder 8 and a pin-like probe 9 which is provided in an end surface of the shoulder in such a manner as to protrude. It is desirable that a length of the pin-like probe 9 is set to be equal to or less than a thickness of the valve seat portion to which the friction stir processing is applied. In this case, a friction stir tool in which the pin does not protrude may be used.

Figure 3:
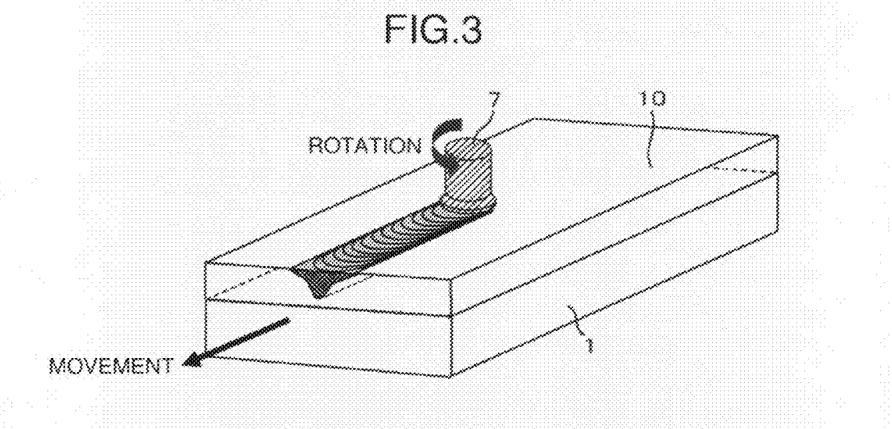
FIG. 3 is a conceptual view of an application of a friction stir processing with respect to a planer valve seat surface.
Figure 4:
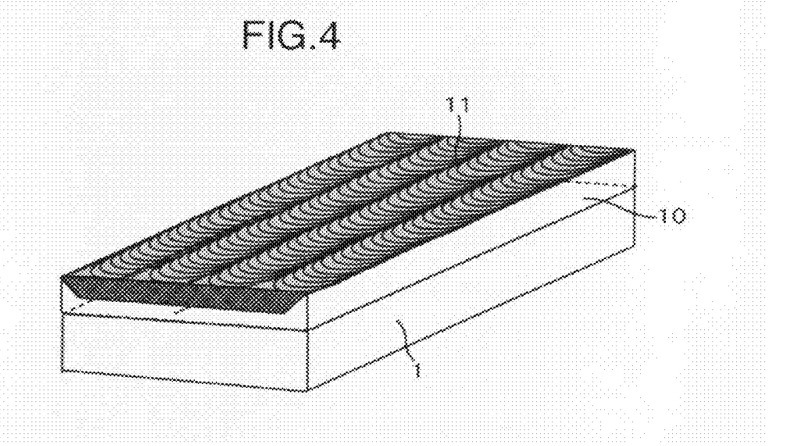
FIG. 4 is a conceptual view of a valve seat surface after applying the friction stir processing to the planer valve seat surface.
Figure 5:
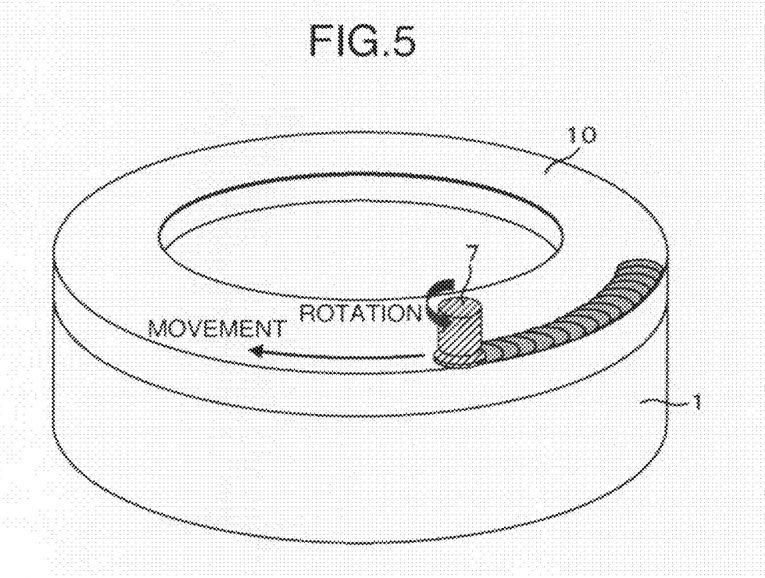
FIG. 5 is a conceptual view of an application of a friction stir processing with respect to a cylindrical valve seat surface.
Figure 6:
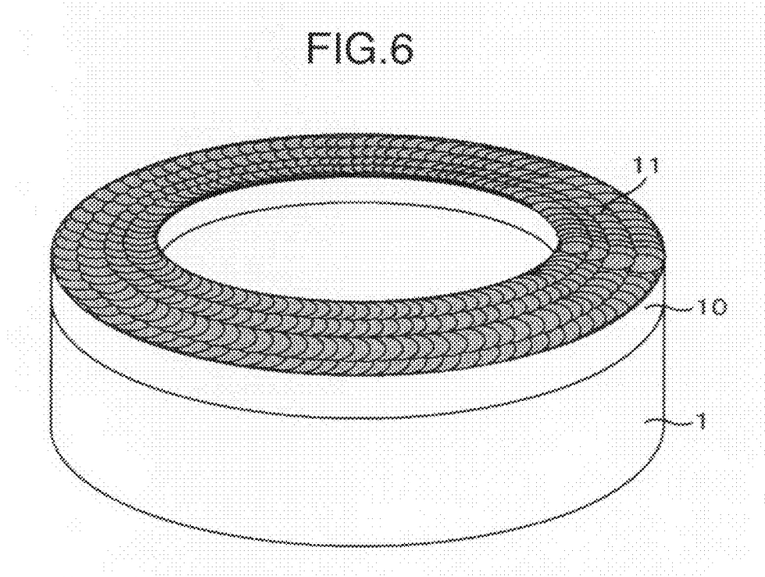
FIG. 6 is a conceptual view of a valve seat surface after applying the friction stir processing to the cylindrical valve seat surface.

The valve seat may employ various shapes such as a flat shape as shown in FIGS. 3 and 4, a cylindrical shape as shown in FIGS. 5 and 6 and the like. Further, the valve seat material may employ aluminum, copper, titanium, magnesium, zinc, silver and the like, and an alloy thereof, in addition to the corrosion resisting and abrasion resisting alloy such as the Co base alloy, the Ni base alloy or the Fe base alloy.

After fixing by clamp the valve seat material to a processing table, the friction stir processing is carried out with respect to the valve seat material. A schematic view at a time of carrying out the surface reforming process of the valve seat by the tool 7 for the friction stir is shown in FIGS. 2 and 4. Further, a schematic view after applying the friction stir processing is shown in FIGS. 3 and 5. At a time of the friction stir processing, it is possible to reform the metallographic structure of only the valve seat surface without lowering a reliability of a joint portion between the valve seat and the valve case or the valve body, by using the friction stir tool in which a pin length is shorter than the thickness of the valve seat material. Further, FIGS. 3 and 5 show an example in which the friction stir processing is applied to all the surface of the valve seat surface, however, the friction stir processing may be applied to a part of the valve seat.

As a condition for execution at a time of the friction stir processing, it is desirable to use a tool of a high hardness ceramics group such as a PCBN or the like for the friction stir tool, and set a rotating speed of a main shaft to 200 to 1200 rpm and a bonding speed to 20 to 400 mm/min. If the friction stir processing is applied to the surface deposit metal such as the Co base alloy, the Ni base alloy or the Fe base alloy under the present condition, the surface after the friction stir processing becomes smooth, and such a defect as a pin hole, a void or the like is not generated in the execution surface.

FIG. 1A shows a schematic view of a cross sectional metallographic structure of a valve seat prepared by dissolving the surface deposit metal such as the Co base alloy, the Ni base alloy or the Fe base alloy at a high temperature, and buildup welding in the valve case and the valve body. In the case of applying the friction stir processing to only the surface layer of the surface deposit metal such as the Co base alloy, the Ni base alloy or the Fe base alloy, the valve seat metallographic structure in the vicinity of the joint portion between the valve seat and the valve case or the valve body remains in the dendrite structure at a time of buildup welding the valve seat with respect to the valve case or the valve body as shown in FIG. 1B, and it is thereafter possible to prepare a valve seat having an inclined structure in which the metallographic structure is different in a thickness direction, such as a transient region of the inner layer (the dendrite) and the surface layer (the cubic) or a processed structure 6, a cubic structure (a base material portion) 4 and a chemical compound phase 5 such as a granular or blocky eutectic carbide, toward the thickness direction of the valve seat and the direction of the valve seat surface.

In the valve seat after the friction stir processing is applied, the metallographic structure of the surface layer of the valve seat comes to the cubic as mentioned above, and the chemical compound phase such as the eutectic carbide or the like crystallizing in the base material gap is simultaneously dispersed like the granular shape or the blocky shape. By applying the present friction stir processing, it is possible to suppress a selective and continuous corrosion damage of the chemical compound phase such as the eutectic carbide or the like, and a continuous progress of an erosion damage, and it is simultaneously possible to suppress an increase of a friction resistance in the slide portion of the valves and a reduction of a leakage resistance caused by a roughness of the valve seat surface or the like. Further, it is possible to provide the valve which is excelling in an impact resistance and a maintenance performance.

The friction stir apparatus for carrying out the process mentioned above is constructed by a stirring means for stirring the valve seat material, a movable table or the like for moving a position of the friction stir processing, a fixing device such as a clamp or the like for fixing the valve seat material to the movable table, and the like. Further, the friction stir processing may be executed while moving the stirring means, and fixing the valve seat material to which the friction stir processing is applied, to a non-movable table or the like. Further, it is possible to provide a heating means for thermally treating the stirred region, and a cutting means for grinding a concavo-convex portion of the surface which is generated by the friction stir, for smoothening the surface after the stirring process.

EMBODIMENT 1

Figure 7:
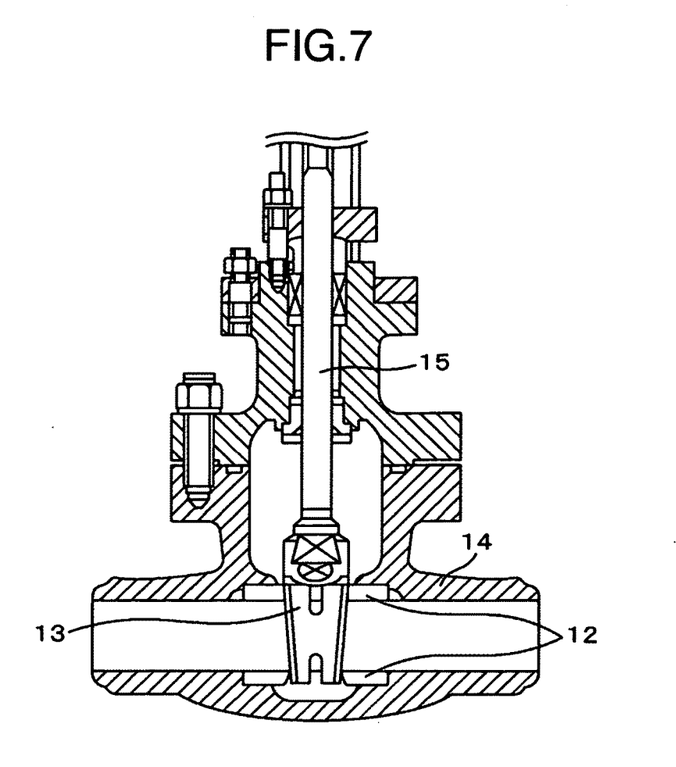
FIG. 7 is a cross sectional view of a main body of a gate valve.
Figure 8:
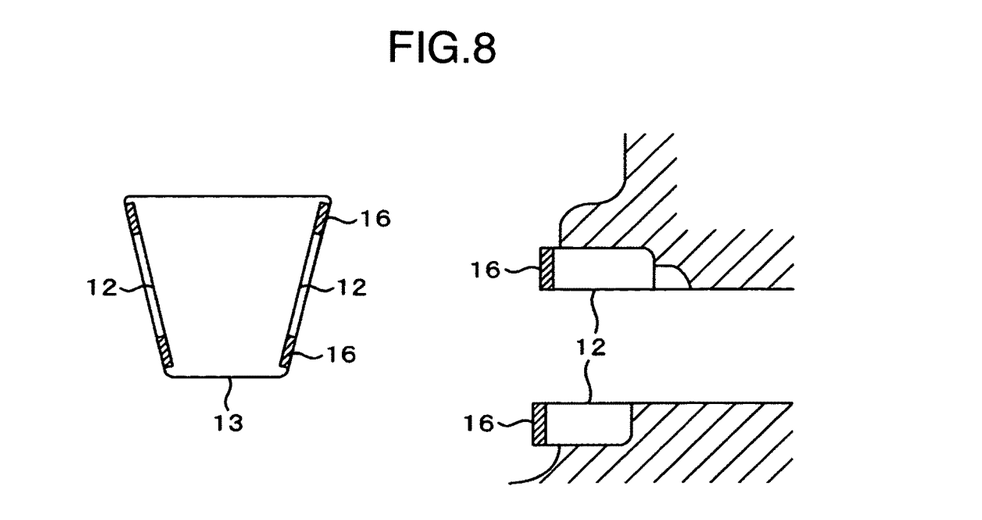
FIG. 8 is a cross sectional view in the vicinity of a valve body 13 of the gate valve and a valve seat portion 12 of a valve case of the gate valve.

FIGS. 7 and 8 show an example in which the present invention is applied to a gate valve having a valve seat using a corrosion resisting and abrasion resisting alloy made of the Co base alloy, the Ni base alloy or the Fe base alloy. In a structure of the valve having the valve seat, a valve case 14 of the gate valve is provided with a valve rod 15 which can be controlled so as to move in a vertical direction by a drive apparatus such as a cylinder or the like, and a valve body 13 which is connected to the valve rod 15. Valve seats 12 are buildup welded to the valve case 14 and the valve body 13 in accordance with a high temperature dissolving. The valve seats 12 is provided for coming into contact on the basis of a movement of the valve body 13, shutting off a flow of a liquid, a gas or a gas-liquid mixed fluid, and preventing a leakage of the fluid, and is constructed by a surface deposit metal made of the Co base alloy, the Ni base alloy or the Fe base alloy.

However, if the valve provided with the valve seat of the surface deposit metal made of the hard material is prepared by dissolving the surface deposit metal such as the Co base alloy, the Ni base alloy, the Fe base alloy or the like at a high temperature, and buildup welding in the valve case 14 and the valve body 13, the valve seat metallographic structure necessarily comes to the dendrite structure, and the chemical compound phase such as the eutectic carbide or the like is finally formed like a mesh in the dendrite gap. Since the chemical compound phase such as the eutectic carbide or the like is continuously distributed in the dendrite gap, once the selective corrosion of the chemical compound phase such as the eutectic carbide or the like is generated, the corrosion continuously makes progress, and a surface roughness of the valve seat and a reduction of a leakage resistance going therewith are generated.

In accordance with the present invention, as a means for solving the problem mentioned above, the chemical compound phase such as the eutectic carbide or the like crystallizing in the dendrite gap is dispersed as a granular shape or a blocky shape equal to or less than about 100 μm, and the valve seat portion 16 to which the friction stir processing is applied is formed, by moving the friction stir tool rotating in a state of being crimped by a load application in a vertical direction of the valve seat surface on the valve seat surface so as to carry out the friction stir processing, with respect to the valve seat surface of the hard surface deposit metal which is prepared by dissolving the surface deposit metal of the Co base alloy, the Ni base alloy or the Fe base alloy at a high temperature and buildup welding in the valve case 14 and the valve body 13, and forming the deposited metallographic structure of the valve seat surface layer portion cubic.

As an execution condition at a time of the friction stir processing, the friction stir tool employs a high hardness type tool such as a PCBN or the like, a rotating speed of a main shaft is set to 200 to 1200 rpm, and a bonding speed is set to 20 to 400 mm/min. Further, an execution depth of the friction stir processing is set to 3 mm (which is less than a thickness of the surface deposit metal of the valve seat), thereby taking into consideration in such a manner as to prevent the friction stir processing from affecting the joint portion between the valve seat 12 and the valve body 14 or the valve case 13.

Executing an observation by optical microscope of a cross section of the valve seat 16 to which the friction stir processing of the Co base alloy, the Ni base alloy or the Fe base alloy is applied, the base material portion of the Co base alloy, the Ni base alloy or the Fe base alloy of the valve seat surface layer comes to the cubic, and the chemical compound phase such as the eutectic carbide or the like is dispersed to the granular shape or the blocky shape which is equal to or less than 10 μm. Further, since the depth of the friction stir processing is set to be equal to or less than the thickness of the surface deposit metal of the valve seat, the metallographic structure of the valve seat in the vicinity of the joint portion between the valve seat 12 and the valve body 14 or the valve case 13 remains in the dendrite structure before executing the friction stir processing, and there is prepared the valve seat having the processed structure, the cubic structure and the inclined structure in which the metallographic structure is different in the thickness direction, toward the thickness direction of the valve seat and the surface direction of the valve seat.

Any defect such as a pin hole, a void or the like is not recognized in the valve seat surface layer to which the friction stir processing is applied. In the gate valve prepared by the method in accordance with the present invention, since it is possible to suppress a continuous progress of the corrosion of the chemical compound phase such as the eutectic carbide or the like caused by a dissolved oxygen, and it is possible to suppress a falling of the base material portion caused by the erosion damage or the like, it is possible to provide a gate valve which can suppress a reduction of a leakage resistance of the valve seat, and is excellent in an impact resistance and a maintenance performance.

In the present embodiment 1, there is shown the example in which the present invention is applied to the gate valve having the valve seat which uses the corrosion resisting and abrasion resisting alloy made of the Co base alloy, the Ni base alloy or the Fe base alloy, however, the present invention is not limited to the gate valve, but may be applied to the other valve which is provided with the valve body and the valve case, and has the valve seats respectively on the surfaces along which both of them slide.

EMBODIMENT 2

Figure 9:
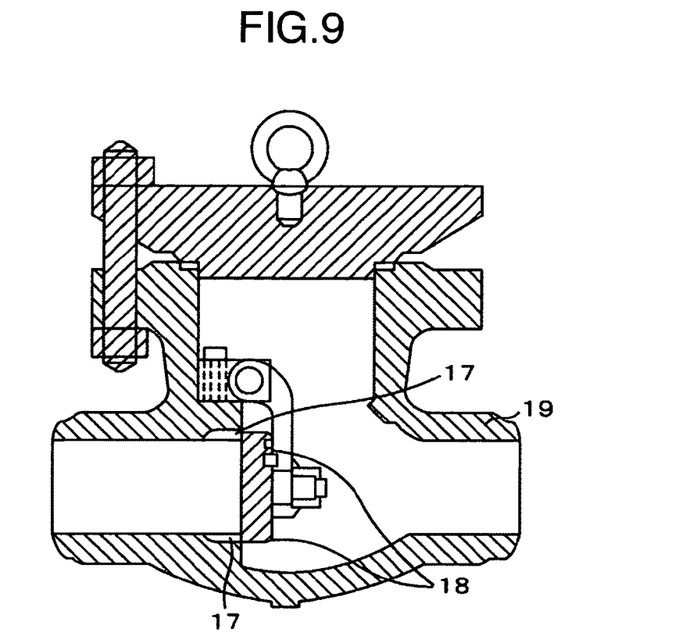
FIG. 9 is a cross sectional view of a main body of a check valve.
Figure 10:
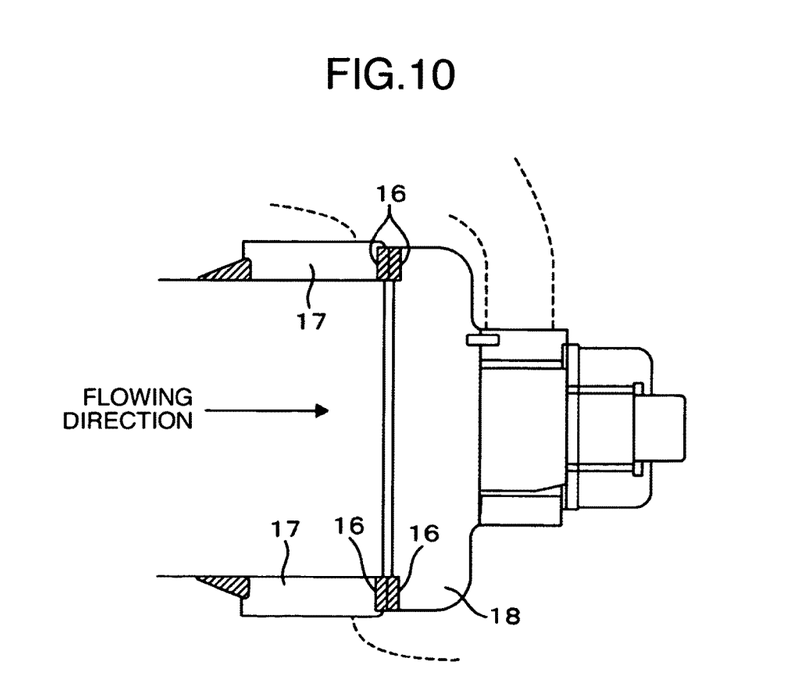
FIG. 10 is a cross sectional view in the vicinity of a valve body 16 of the check valve and a valve seat portion 17 of a valve case of the check valve.

FIGS. 9 and 10 show an example in which the present invention is applied to a check valve having a valve seat using a corrosion resisting and abrasion resisting alloy made of the Co base alloy, the Ni base alloy or the Fe base alloy. In the present check valve, in the same manner as the gate valve shown in the embodiment 1, valve seats are buildup welded to a valve case 19 and a valve body 18 in accordance with a high temperature dissolving, the valve seats being constructed by a surface deposit metal made of the Co base alloy, the Ni base alloy or the Fe base alloy.

In the check valve, if the valve provided with the valve seat of the surface deposit metal made of the hard material is prepared by dissolving the surface deposit metal such as the Co base alloy, the Ni base alloy, the Fe base alloy or the like at a high temperature, and buildup welding in the valve case 19 and the valve body 18, the valve seat metallographic structure necessarily comes to the dendrite structure, and the chemical compound phase such as the eutectic carbide or the like is finally formed like a mesh in the dendrite gap. Since the chemical compound phase such as the eutectic carbide or the like is continuously distributed in the dendrite gap, once the selective corrosion of the chemical compound phase such as the eutectic carbide or the like is generated, the corrosion continuously makes progress, and a surface roughness of the valve seat and a reduction of a leakage resistance going therewith are generated.

In the embodiment 2, in the same manner as the embodiment 1, the chemical compound phase such as the eutectic carbide or the like crystallizing in the dendrite gap is dispersed as a granular shape or a blocky shape equal to or less than about 100 μm, and the valve seat portion 16 to which the friction stir processing is applied is formed, by moving the friction stir tool rotating in a state of being crimped by a load application in a vertical direction of the valve seat surface on the valve seat surface so as to carry out the friction stir processing, with respect to the valve seat surface of the hard surface deposit metal which is prepared by dissolving the surface deposit metal of the Co base alloy, the Ni base alloy or the Fe base alloy at a high temperature and buildup welding in the valve case 19 and the valve body 18, and forming the deposited metallographic structure of the valve seat surface layer portion cubic.

As an execution condition at a time of the friction stir processing, the friction stir tool employs a high hardness type tool such as a PCBN or the like, a rotating speed of a main shaft is set to 200 to 1200 rpm, and a bonding speed is set to 20 to 400 mm/min. Further, an execution depth of the friction stir processing is set to 3 mm (which is less than a thickness of the surface deposit metal of the valve seat), thereby taking into consideration in such a manner as to prevent the friction stir processing from affecting the joint portion between the valve seat and the valve body 18 or the valve case 19.

Executing an observation by optical microscope of a cross section of the valve seat 16 to which the friction stir processing of the valve seat of the Co base alloy, the Ni base alloy or the Fe base alloy is applied, the base material portion of the Co base alloy, the Ni base alloy or the Fe base alloy of the valve seat surface layer comes to the cubic, and the chemical compound phase such as the eutectic carbide or the like is dispersed to the granular shape or the blocky shape which is equal to or less than 100 μm. Further, since the depth of the friction stir processing is set to be equal to or less than the thickness of the surface deposit metal of the valve seat, the metallographic structure of the valve seat in the vicinity of the joint portion between the valve seat and the valve body 18 or the valve case 19 remains in the dendrite structure before executing the friction stir processing, and there is prepared the valve seat having the processed structure, the cubic structure and the inclined structure in which the metallographic structure is different in the thickness direction, toward the thickness direction of the valve seat and the surface direction of the valve seat.

Any defect such as a pin hole, a void or the like is not recognized in the valve seat surface layer to which the friction stir processing is applied. In the gate valve prepared by the method in accordance with the present invention, since it is possible to suppress a continuous progress of the corrosion of the chemical compound phase such as the eutectic carbide or the like caused by a dissolved oxygen, and it is possible to suppress a falling of the base material portion caused by the erosion damage or the like, it is possible to provide a gate valve which can suppress a reduction of a leakage resistance of the valve seat, and is excellent in an impact resistance and a maintenance performance.

In the present embodiment 2, there is shown the example in which the present invention is applied to the check valve having the valve seat which uses the corrosion resisting and abrasion resisting alloy made of the Co base alloy, the Ni base alloy or the Fe base alloy, however, the present invention is not limited to the check valve, but may be applied to the other valve which is provided with the valve body and the valve case, and has the valve seats respectively on the surfaces along which both of them slide.

The present invention can be applied to various materials in which a corrosion resistance and an abrasion resistance are requested, and can be particularly utilized for suppressing the corrosion and the erosion damage in the valve seat made of the Co base alloy, the Ni base alloy or the Fe base alloy.

It should be further understood by those skilled in the art that the foregoing description has been made on embodiments of the invention and that various changes and modifications may be made in the invention without departing from the spirit of the invention and the scope of the appended claims.

The invention claimed is:
1. A valve, including:
   a valve body;
   a valve case;
   a first valve seat disposed on sliding surfaces of the valve body; and
   a second valve seat disposed on a sliding surface of the valve case;
   wherein each of said first and second valve seats is constructed of a welded metal comprising at least one of: a Co base alloy, an Ni base alloy, and an Fe base alloy;
   wherein each of said first and second valve seats has a plurality of layers in a thickness direction, including: an inner layer with a dendrite structure, a middle layer with a processing structure, and a surface layer with a cubic structure, and a layer of base material; and
   wherein said surface layer of each of said first and second valve seats is formed by a base portion made of the cubic structure, wherein dispersed in the base portion is: a granular eutectic chemical compound having a grain diameter equal to or less than 100 µm, or a blocky eutectic chemical compound having a block diameter equal to or less than 100 µm.
2. A valve as claimed in claim 1, wherein each of said first and second valve seats is formed to include a surface hardened weld overlay material, the weld overlay material being surface hardened by friction stir processing of the surface of the weld overlay material, including melting or half melting the surface of the weld overlay material, and cooling the surface of the weld overlay material after melting or half melting.
3. A valve as claimed in claim 1, wherein said valve is used in a nuclear power plant.
4. A valve as claimed in claim 1,
   wherein dispersed in the base portion is a granular eutectic chemical compound having a grain diameter equal to or less than 100 µm.
5. A valve as claimed in claim 1,
   wherein dispersed in the base portion is a blocky eutectic chemical compound, having a grain diameter equal to or less than 100 µm.
6. A valve as claimed in claim 1, wherein each of said first and second valve seats includes the layer of base material, disposed as follows in relation to other layers in a thickness direction:
   the layer of base material, the inner layer with the dendrite structure, the middle layer with the processing structure, and the surface layer with the cubic structure.

* * * * *